Oct. 20, 1970 D. E. GRIFFERY 3,535,445

CATHODE RAY TUBE PROTECTION CIRCUIT

Filed Aug. 18, 1967

Inventor
DONALD E. GRIFFEY

BY Mueller, Aichele & Rauner

ATTYS.

United States Patent Office 3,535,445
Patented Oct. 20, 1970

3,535,445

CATHODE RAY TUBE PROTECTION CIRCUIT

Donald E. Griffey, Skokie, Ill., assignor to Motorola, Inc., Franklin Park, Ill., a corporation of Illinois

Filed Aug. 18, 1967, Ser. No. 661,667
Int. Cl. H04n *3/20;* H01j *29/52*
U.S. Cl. 178—7.5 10 Claims

ABSTRACT OF THE DISCLOSURE

A power supply for a receiver employing the circuit provides a pair of DC voltages one of which decays faster than the other after the supply is de-energized. An electronic switch is closed when both voltages are present to couple an operating bias potential to the cathode ray tube. When the power supply is de-energized, the switch opens in response to the rapidly decaying voltage to isolate the operating bias potential from the cathode ray tube and to permit another potential to be applied thereto of a value to increase conduction in the tube and discharge the Aquadag coating.

BACKGROUND OF THE INVENTION

During the operation of a cathode ray tube, a charge is developed on its Aquadag coating (trademark of Acheson Industries, Inc. for their brand of colloidal graphite in water) and on other storage devices associated with the cathode ray tube such as the capacitors coupling the video information to the tube. When the supply voltages to the television receiver incorporating the tube are removed, electrons from the still hot cathode are attracted towards the coating to the fluorescent screen and the horizontal and vertical sweeps cease, to cause the electron beams to be focused on one portion of the screen. The cessation of the sweep is particularly fast in transistorized television receivers where the supply voltage for the the sweep circuits decays substantially immediately after the power supply is de-energized. Thus, the electron beam can be maintained in one spot for an appreciable amount of time after the receiver is turned off. The energy in the electron beam applied to one portion of the fluorescent screen causes the fluorescent material to become heated and damaged.

Prior circuits for eliminating this problem have used the energy stored in the power supply to bias off the tube while the cathode is cooled. In television sets incorporating transistor circuits it may not be feasible to store energy for the length of time necessary to allow the cathode to cool because the low impedance of the transistor circuits cause the supply voltages to decay rather rapidly. Also, the Aquadag coating would remain charged for some period of time following turnoff of the receiver so that although the receiver appears harmless to a serviceman, he would receive a substantial shock if he touched an electrode connected to the Aquadag coating. In addition, if the receiver is turned on a short time later, the charged Aquadag coating would be drawing electrons to the screen before the finite time required for the sweep circuits to build up again to thereby subject the screen to damage. Lastly, many present day television receivers employ circuitry to continually energize the picture tube filament windings even when the receiver is off in order to provide a picture within a few seconds after the receiver is turned on. This, of course, means that the cathode is maintained warm so that it continually emits electrons to be attracted to the fluorescent screen if the Aquadag coating is not discharged. Protection circuits operated by the television set on-off switch are not useful when the set is turned off by a timer, or when the power supply plug is removed from the wall socket, or when a fault appears in the power supply as may occur during alignment of the set at the factory.

SUMMARY OF THE INVENTION

It is, therefore, an object of this invention to provide a protection circuit to rapidly discharge the energy stored in a cathode ray tube and circuitry associated therewith before complete collapse of the sweep to prevent damage to the fluorescent screen of the tube.

Another object is to provide a protection circuit which automatically discharges the energy storage means associated with the cathode ray tube upon energization of the receiver power supply independent of the events causing such de-energization.

Another object is to provide a protection circuit to automatically discharge a cathode ray tube in a transistorized television receiver which has a power supply providing both rapid decay and slow decay supply voltages.

In practicing the invention, a television receiver power supply provides first and second DC voltages the former of which decays faster than the other after the supply is de-energized. A first circuit couples an operating bias potential to the cathode ray tube, and a second circuit couples a further bias potential to the cathode ray tube of a value to increase conduction thereof to rapidly discharge energy storage means associated with the tube. One of the circuits includes an electronic switch responsive to the presence of both voltages to cause the first circuit to couple the operating bias potential to the cathode ray tube and to isolate the further bias potential therefrom. The switch is further responsive to the decay of the first DC voltage to couple the further bias potential to the cathode ray tube.

DETAILED DESCRIPTION OF THE PREFERRED EMBODIMENTS

Figure 1:
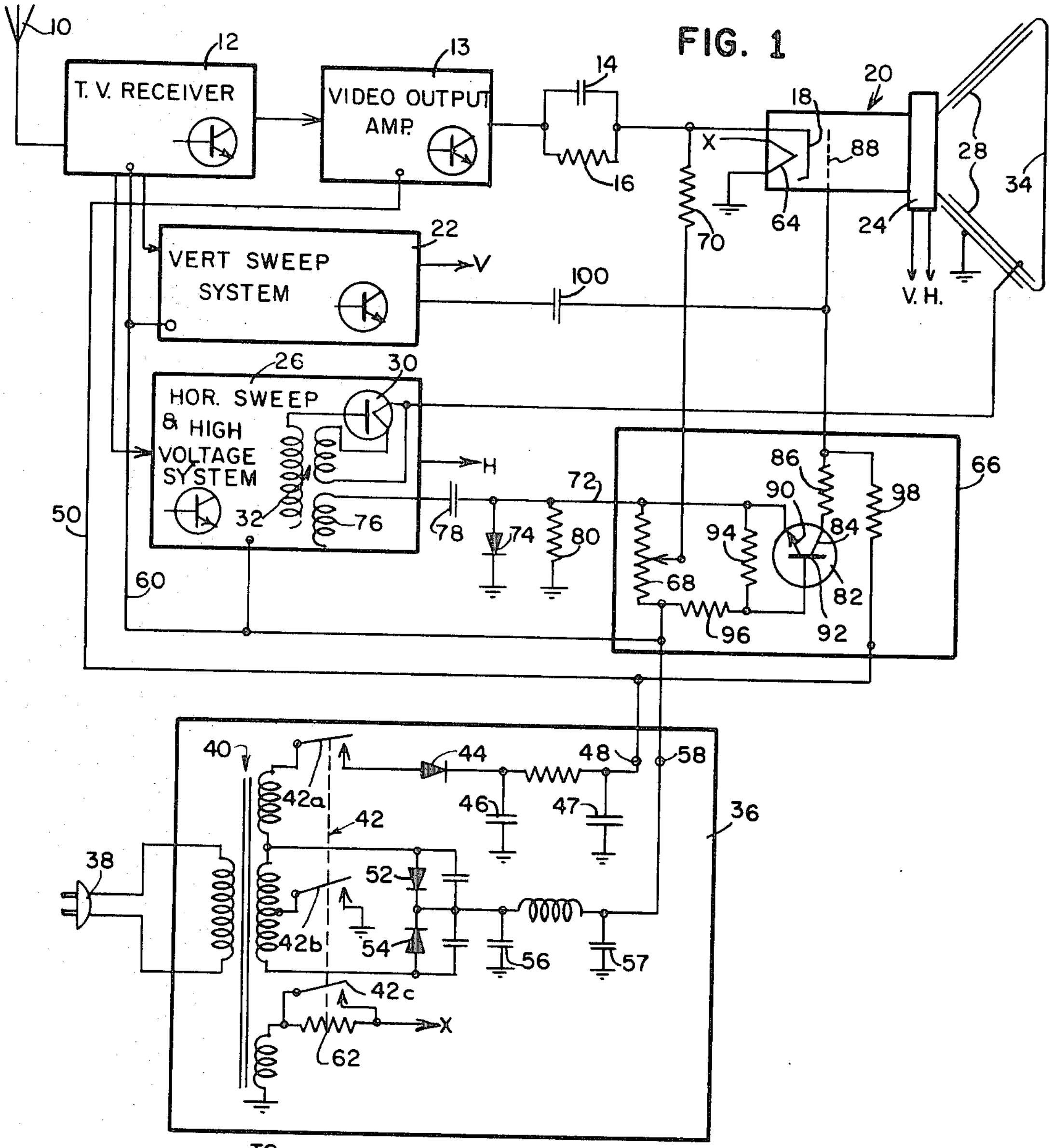
FIG. 1 illustrates a television receiver partially in schematic and partially in block incorporating the features of the invention.

Referring now to FIG. 1, television signals are received by antenna 10 and processed in a known manner by a transistorized television receiver 12 to produce video signals. Such receiver may include a tuner to convert the television signals into intermediate frequency signals which are then amplified and detected to produce the video signals. The receiver 12 may include low level video amplifiers for amplifying the video signals. Such signals are then amplified in a video output amplifier 13 and coupled through the parallel combination of capacitor 14 and resistor 16 to the cathode 18 of cathode ray tube 20. Synchronizing signals from receiver 12 are coupled to a transistorized vertical sweep system 22 which develops a sawtooth signal to be applied to the yoke assembly 24 for vertically deflecting the cathode ray beam. Synchronizing signals are also coupled to a horizontal sweep and high voltage system 26 which develops a sawtooth signal at the horizontal rate to be coupled to the yoke assembly 24 to horizontally deflect the cathode ray beam. High voltage for the Aquadag coating 28 of cathode ray tube 20 is provided by means of a high voltage rectifier 30 coupled to a transformer 32 in the horizontal sweep and high voltage system 26. The high voltage on Aquadag coating 28 attracts electrons from the cathode 18 so that they impinge on the fluorescent screen 34.

Power supply 36 is connected to a plug 38 which may be inserted in a wall outlet to apply AC signals to a power transformer 40. The AC voltage is applied through one pair of contacts 42*a* of a viewer accessible on-off switch 42 to be rectified by diode 44 and filtered by capacitors 46 and 47 to develop a first DC supply voltage on terminal 48. This voltage is applied through a conductor 50 to the video output amplifier 13 and is on the order of 200 volts or more so that such amplifier is able to develop the large swing video signals necessary to drive the cathode ray tube 20. The video output amplifier 13 is generally a low power dissipation stage, that is during operation, the current drawn by it is relatively small so that the effective impedance it presents to the power supply 36 is rather high. When the power supply 36 is de-energized, the voltage on terminal 48 is maintained for a period of time because the capacitors 46 and 47 discharge through such high impedance. However, the voltage is not present long enough to cutoff the beam in the cathode ray tube 20 before the cathode 18 cools as is the case in television sets using vacuum tubes.

AC signals in the transformer 40 are rectified by a pair of diodes 52 and 54 when a second pair of contacts **42*b* of switch 42 are closed and filtered by capacitors 56 and 57 to provide a second DC voltage on terminal 58. This voltage is applied via conductor 60 to the vertical sweep system 22 and the horizontal sweep and high voltage system 26 which are high power dissipation circuits and therefore present a low impedance to the power supply 36 so that when the same is de-energized the voltage on terminal 58 decays substantially immediately. The voltage on terminal 58 and a divided down representation thereof also supply components in the television receiver 12**.

AC signals in transformer 40 are also applied through a current limiting resistor 62 to the cathode ray tube filament 64 to maintain the cathode ray tube partially on even though the power supply 36 is de-energized. When the third pair of contacts **42*c* of on-off switch 42 are closed, full operating current flows through the filament 64 to render cathode ray tube 20** fully operative.

The charge stored on the Aquadag coating 28 of cathode ray tube 20 attracts electrons from the hot cathode 18 causing the electrons to strike fluorescent screen 34. When the receiver is in normal operation, the electron beam is swept over the screen 34 rapidly so that the energy in the beam is not dissipated at any one point on the screen. However, when the power supply 36 is de-energized, the voltage on terminal 58 decays substantially immediately so that the horizontal and vertical sweeps collapse and the electron beam is concentrated at one position on the screen 24 until the cathode 18 cools or the Aquadag coating 28 is discharged. With the filaments 64 being partially on even with the power supply 36 de-energized, such cooling of the cathode 18 is particularly difficult. The stream of electrons thus directed at one position on the screen 34 may be sufficient to burn the screen and damage the tube.

In order to prevent this damage, a protection circuit 66 for substantially discharging the Aquadag coating 28 before the sweeps have collapsed is provided. A cathode potential for the cathode 18 of cathode ray tube 20 is provided by coupling a tap on a viewer accessible brightness control potentiometer 68 through a resistor 70 to the cathode 18. The terminals of the potentiometer may be connected between the fast decay DC voltage from the terminal 58 of power supply 36 and the conductor 72. A negative voltage on conductor 72 is provided by a diode 74 which rectifies flyback pulses on the auxiliary winding 76 of transformer 32, along with a capacitor 78 on a resistor 80 to provide a DC return. A negative voltage on conductor 72, although not necessary to the operation of the invention as explained in the FIG. 2 embodiment, increases the range of cathode potentials and thus brightness variations by increasing the potential difference across potentiometer 68.

The protection circuit 66 includes an electron switch such as a transistor 82 having its collector 84 coupled through a resistor 86 to the control grid 88 of cathode ray tube 20. The emitter 90 is coupled to a first grid potential, here the negative voltage on conductor 72. The control electrode or base 92 of transistor 82 is coupled to a bias circuit including resistors 94 and 96 to a biasing potential such as the fast decay DC voltage on terminal 58 of power supply 36. The values of resistors 94 and 96 are such as to bias transistor 82 into saturation so that the first grid potential on conductor 72 is coupled to grid 88. This potential will be negative with respect to the cathode potential (depending on the setting on the tap of the potentiometer 68) so that the cathode ray tube 20 is biased into an operating condition.

The grid 88 is also coupled through a resistor 98 to a second grid potential, here the "slow" decay DC voltage on terminal 48 of power supply 36. Resistor 98 has a value substantially greater than resistor 86 so that when the power supply 36 is energized to saturate transistor 82, the negative voltage on conductor 72 will appear on the grid 88 whereas the second grid potential applied to resistor 98 will be substantially isolated therefrom.

In a practical embodiment resistor 98 was twenty times the value of resistor 86 so that when transistor 82 was conductive, only five percent of the voltage on terminal 48 appeared on the grid 88.

When the power supply 36 is de-energized, the DC voltage on terminal 58 decays substantially immediately as does the negative voltage on conductor 72 to remove the bias on transistor 82 and thereby cut it off. Now the impedance of resistor 98 is substantially less than the impedance of the transistor collector to emitter junction so that the DC voltage on terminal 48 (which has not yet decayed because it only supplied the video output amplifier 13) is coupled to the grid 88 of cathode ray tube 20. This voltage is considerably more positive than the cathode potential so that the cathode ray tube 20 becomes heavily conductive to discharge the Aquadag coating 28. To further enhance this effect, the flyback pulses across auxiliary winding 76 also disappear substantially immediately when the power supply 36 is de-energized by reason of the horizontal sweep and the high voltage system 26 being supplied by the "fast" decay voltage on terminal 58 so that the cathode 18 of cathode ray tube 20 effectively becomes grounded to further increase the conduction of the cathode ray tube.

It may be appreciated that the operation just explained serves to drain the Aquadag almost immediately after the power supply 36 is de-energized so that even though the sweep systems collapse upon such de-energization, the Aquadag is drained quickly so that it cannot damage the cathode ray tube screen 34. This occurs whether the de-energization is effected by turning off the switch 42, or removing plug 38 from the wall outlet, or a fault in the power supply 36. In all such cases, the result is to cause the voltage on terminal 48 to remain for a limited time and to cause the voltage on terminal 58 to disappear substantially immediately to both of which the protection circuit 66 is responsive to drain the Aquadag coating.

Pulses for blanking the cathode ray tube during vertical retrace for purposes known to those skilled in television art are coupled from the vertical sweep system 22 through a capacitor 100 to the grid 88 of cathode ray tube 20. Since the duration of the pulses must be carefully controlled, it is desirable that the load presented to them be constant. This is one reason for connecting the brightness control potentiometer 68 to the cathode of the cathode ray tube so that brightness adjustment will not affect the blanking pulses.

Figure 2:
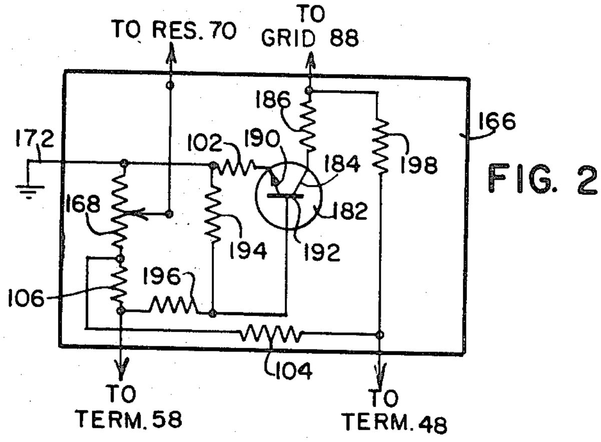
FIG. 2 illustrates another embodiment of the invention.

FIG. 2 shows a second embodiment of the invention in which similar parts are labeled with similar reference numerals plus a factor of 100. This circuit operates similarly to the circuit of FIG. 1. The conductor 172 is grounded instead of being coupled to the auxiliary winding 74 of the horizontal sweep and high voltage system 26 and a current limiting resistor 102 has been added. To provide additional brightness range, a resistor 104 couples the higher value slow decay voltage to the potentiometer 168. A resistor 106 isolates from each other the fast and slow decay voltage on terminals 58 and 48 respectively.

In a circuit of practical construction the following component values and supply voltages were used:

| | |
|---|---|
| Capacitor **46** | 40 microfarads. |
| Capacitor **47** | 40 microfarads. |
| Capacitor **56** | 400 microfarads. |
| Capacitor **57** | 400 microfarads. |
| Resistor **70** | 150K ohms. |
| Resistor **102** | 470 ohms. |
| Resistor **104** | 22K ohms. |
| Resistor **106** | 10K ohms. |
| Potentiometer **168** | 0–100K ohms. |
| Resistor **186** | 12K ohms. |
| Resistor **194** | 1000 ohms. |
| Resistor **196** | 56K ohms. |
| Resistor **198** | 270K ohms. |
| Voltage on terminal **48** | 225 volts. |
| Voltage on terminal **58** | 75 volts. |

What is claimed is:

1. In a television receiver having a cathode ray tube with grid and cathode electrodes and an associated energy storage means, the combination of; a power supply to provide first and second direct current voltages for the receiver, the latter of which decays sooner than the other when the power supply is de-energized, first circuit means for coupling a first bias potential to one of the electrodes of the cathode ray tube for operating the same, second circuit means for coupling a second bias potential to said one of the electrodes of the cathode ray tube of a value to increase conduction thereof to rapidly discharge the energy storage means, one of said circuit means including an electronic switch having control means coupled to the power supply and responsive to said first and second direct current voltages to cause said first circuit means to couple said first bias potential to said one of the electrodes of the cathode ray tube, said electronic switch being responsive to the decay of said second direct current voltage to couple said second bias potential through said second circuit means to said one of the electrodes of the cathode ray tube, and additional circuit means including a brightness control potentiometer coupled between said second direct current voltage and said first bias potential and having a tap coupled to another electrode of the cathode ray tube.

2. The television receiver set forth in claim 1 wherein said electronic switch is closed during the presence of said first and second direct current voltages and is opened when said second direct current voltage decays, said first circuit means including the electronic switch and first resistor means serially coupled between said one of the electrodes of the cathode ray tube and said first bias potential, said second circuit means including second resistor means coupled between said one of the electrodes of the cathode ray tube and said second bias potential and having a value large with respect to the value of said first resistor means, whereby the impedance presented to said first bias potential is small compared to the impedance presented to said second bias potential when said electronic switch is closed, and whereby the impedance presented to said second bias potential is small compared to the impedance presented to said first bias potential when said electronic switch is opened.

3. The television receiver set forth in claim 1 wherein said one of the electrodes of the cathode ray tube is the grid and said other electrode of the cathode ray tube is the cathode.

4. The television receiver set forth in claim 1 wherein said first circuit means includes the electronic switch and first resistor means coupled to said one of the electrodes of the cathode ray tube, the electronic switch comprising a semicondutor device having a control electrode corresponding to said control means and a pair of output electrodes respectively coupled to said first resistor means and to said first bias potential, said first circuit means including bias means coupled to said control electrode to bias said device into saturation during the presence of said first and second direct current voltages and to cutoff the same when said second direct current voltage decays, said second circuit means including second resistor means coupled between said one of the electrodes of the cathode ray tube and said second bias potential and having a value large with respect to the value of said first resistor means, whereby the impedance presented to said first bias potential is small compared to the impedance presented to said second bias potential when said device is saturated, and whereby the impedance presented to said second bias potential is small compared to the impedance presented to said first bias potential when said device is cutoff.

5. In a transistorized television receiver having a cathode ray tube with grid and cathode electrodes and an Aquadag coating, a receiver system for applying television signals to the cathode of the cathode ray tube and including low power dissipation circuits, a high power dissipation sweep and high voltage system for deflecting an electron beam in the cathode ray tube and for charging the Aquadag coating, a power supply to provide a first direct current voltage at least for the sweep and high voltage system so that substantially immediately after de-energization of the power supply the first direct current voltage decays and the deflection of the electron beams ceases, the power supply providing a second direct current voltage for the low power dissipation circuits of the receiver system so that the second direct current voltage remains a limited time following de-energization of the power supply, a protection circuit for the cathode ray tube including in combination; a brightness control potentiometer coupled between said first direct current voltage and a first grid potential and having a tap coupled to said cathode electrode of the cathode ray tube to apply a cathode potential thereto, second circuit means coupled between the grid electrode and the first grid potential of a value relative to the cathode potential to negatively bias the cathode ray tube, said second circuit means including a semiconductor device having control means responsive to said first and second direct current voltages to render said semiconductor device conductive and couple said first grid potential to the grid electrode, and third circuit means coupled between the grid electrode and a second grid potential of a value relative to the cathode potential to at least zero bias the cathode ray tube to discharge the Aquadag coating, said control means being responsive to the decay of said first direct current voltage to render said semiconductor device nonconductive and substantially isolate said first grid potential from the grid electrode and apply said second grid potential thereto.

6. The television receiver set forth in claim 5 wherein said semiconductor device includes a transistor with a pair of output electrodes and a control electrode corresponding to said control means, said second circuit means including first resistor means coupled in series with said output electrodes, said grid electrode and said first grid potential, said second circuit means further including a bias network coupled to said control electrode to bias said transistor into saturation during the presence of said first and second direct current voltages and to cutoff the same when said second direct current voltage decays, said third circuit means including second resistor means coupled between the grid electrode and the second grid potential and having a value large with respect to the value of said first resistor means, whereby the impedance presented to said first grid potential is small compared to the impedance presented to said second grid potential when said transistor is saturated, and whereby the impedance presented to said second grid potential is small compared to the impedance presented to said first grid potential when said transistor is cutoff.

7. The television receiver set forth in claim 6 wherein one output electrode of said transistor is coupled to said first grid potential and the other output electrode thereof is coupled through said first resistor means to said grid electrode, said second grid potential corresponding to said second direct current voltage, said bias network being coupled to said first direct current voltage for saturating said transistor in the presence of said first direct current voltage and for cutting off said transistor in the absence thereof.

8. The television receiver set forth in claim 7 wherein said first grid potential corresponds to ground reference potential.

9. The television receiver set forth in claim 7 wherein said sweep and high voltage system includes flyback pulse supply means, rectifying and filtering means being coupled to said supply means to convert the flyback pulses into said first grid potential.

10. The television receiver set forth in claim 9 further including a source of blanking pulses, and means coupling the pulses to the grid electrode of the cathode ray tube.

References Cited

UNITED STATES PATENTS 3,112,425 11/1963 Theisen ------------- 315—30

ROBERT L. GRIFFIN, Primary Examiner

J. C. MARTIN, Assistant Examiner

U.S. Cl. X.R.

315—20, 30

UNITED STATES PATENT OFFICE
CERTIFICATE OF CORRECTION

Patent No. 3,535,445 Dated October 20, 1970

Inventor(s) Donald E. Griffey

It is certified that error appears in the above-identified patent and that said Letters Patent are hereby corrected as shown below:

In the heading to the sheet of drawings, line 1, "D. E. GRIFFERY" should read -- D. E. Griffey --.

Signed and sealed this 13th day of April 1971.

(SEAL)
Attest:

EDWARD M.FLETCHER,JR.
Attesting Officer

WILLIAM E. SCHUYLER, JR.
Commissioner of Patents

FORM PO-1050 (10-69)

USCOMM-DC 60376-P69
★ U.S. GOVERNMENT PRINTING OFFICE : 1969 O—366-334